US011943857B2

(12) United States Patent
Van De Sluis et al.

(10) Patent No.: US 11,943,857 B2
(45) Date of Patent: Mar. 26, 2024

(54) CONTROLLER FOR RESTRICTING CONTROL OF A LIGHTING UNIT IN A LIGHTING SYSTEM AND A METHOD THEREOF

(71) Applicant: SIGNIFY HOLDING B.V., Eindhoven (NL)

(72) Inventors: Bartel Marinus Van De Sluis, Eindhoven (NL); Jerome Eduard Maes, Eindhoven (NL); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 214 days.

(21) Appl. No.: 17/635,787

(22) PCT Filed: Aug. 17, 2020

(86) PCT No.: PCT/EP2020/072995

§ 371 (c)(1),
(2) Date: Feb. 16, 2022

(87) PCT Pub. No.: WO2021/032677

PCT Pub. Date: Feb. 25, 2021

(65) Prior Publication Data

US 2022/0304128 A1 Sep. 22, 2022

(30) Foreign Application Priority Data

Aug. 19, 2019 (EP) .................................... 19192285

(51) Int. Cl.
*H05B 47/19* (2020.01)

(52) U.S. Cl.
CPC .................................... *H05B 47/19* (2020.01)

(58) Field of Classification Search
CPC ................................ H05B 47/19; H05B 45/00
See application file for complete search history.

(56) References Cited

U.S. PATENT DOCUMENTS

| | | | | |
|---|---|---|---|---|
| 9,084,329 | B2 * | 7/2015 | Pezzutti | H05B 45/20 |
| 2016/0270194 | A1 * | 9/2016 | Newton | H05B 45/12 |

(Continued)

FOREIGN PATENT DOCUMENTS

| | | | |
|---|---|---|---|
| WO | 2016124390 | A1 | 8/2016 |
| WO | 2019030114 | A1 | 2/2019 |
| WO | 2019034542 | A1 | 2/2019 |

*Primary Examiner* — Raymond R Chai

(57) ABSTRACT

A method of restricting control of one or more lighting units (110) in a lighting system (100) is disclosed. The lighting system (100) comprises the one or more lighting units (110), a first control device (130) for controlling the one or more lighting units (110) and a portable control device (120) for controlling the one or more lighting units (110). The method comprises: determining a position of the portable control device (120) relative to a surface (140), setting the one or more lighting units (110) to a first control mode or a second control mode in dependence on the position of the portable control device (120) relative to the surface (140). When the one or more lighting units (110) have been set to the first control mode, the one or more lighting units (110) are configured to be controlled by both the first control device (130) and the portable control device (120), and when the one or more lighting units (110) have been set to the second control mode, the one or more lighting units (110) are configured to be controlled by the portable control device (120), and wherein control of the one or more lighting units (110) by the first control device (130) is at least partially restricted.

15 Claims, 5 Drawing Sheets

(56) References Cited

U.S. PATENT DOCUMENTS

| | | | | |
|---|---|---|---|---|
| 2017/0345290 | A1* | 11/2017 | Law | H04L 12/283 |
| 2018/0035513 | A1* | 2/2018 | Magielse | H05B 47/125 |
| 2018/0153023 | A1* | 5/2018 | Meerbeek | H04R 1/028 |
| 2018/0368239 | A1* | 12/2018 | Meerbeek | H05B 47/19 |
| 2019/0141824 | A1 | 5/2019 | De Jong et al. | |
| 2019/0215926 | A1* | 7/2019 | Lay | F21V 15/01 |
| 2020/0329546 | A1* | 10/2020 | Krajnc | H05B 47/19 |

* cited by examiner

CONTROLLER FOR RESTRICTING CONTROL OF A LIGHTING UNIT IN A LIGHTING SYSTEM AND A METHOD THEREOF

CROSS-REFERENCE TO PRIOR APPLICATIONS

This application is the U.S. National Phase application under 35 U.S.C. § 371 of International Application No. PCT/EP2020/072995, filed on Aug. 17, 2020, which claims the benefit of European Patent Application No. 19192285.5, filed on Aug. 19, 2019. These applications are hereby incorporated by reference herein.

FIELD OF THE INVENTION

The invention relates to a method of restricting control of a lighting unit in a lighting system, the lighting system comprising the lighting unit, a first control device for controlling the lighting unit and a portable control device for controlling the lighting unit. The invention further relates to a computer program product for executing the method. The method further relates to a controller for restricting control of a lighting unit in a lighting system, the lighting system comprising the lighting unit, a first control device for controlling the lighting unit and a portable control device for controlling the lighting unit.

BACKGROUND

Smart lighting systems enable users to control lighting units in an environment, such as the user's home. Such smart lighting systems may comprise multiple lighting units and lighting control devices connected to the lighting units. The light output of the lighting units is controlled based on, for example, user inputs received via user input devices (e.g. light switches, smartphones), preprogrammed routines, user actuated sensor inputs, etc. When lighting units are configured to receive multiple inputs from multiple devices, the problem arises that when a user has selected a certain light setting for a lighting unit, it may be overruled by another lighting control device or lighting control routine.

SUMMARY OF THE INVENTION

It is an object of the present invention to restrict control of a lighting unit in a lighting system in an intuitive way.

According to a first aspect of the present invention, the object is achieved by a method of restricting control of one or more lighting units in a lighting system, the lighting system comprising the one or more lighting units, a first control device for controlling the one or more lighting units and a portable control device remote from the one or more lighting units for wirelessly controlling the one or more lighting units, the method comprising:

determining a position of the portable control device relative to a surface, setting the one or more lighting units to a first control mode or a second control mode in dependence on the position of the portable control device relative to the surface, wherein, when the one or more lighting units have been set to the first control mode, the one or more lighting units are configured to be controlled by both the first control device and the portable control device, wherein, when the one or more lighting units have been set to the second control mode, the one or more lighting units are configured to be controlled by the portable control device, and wherein control of the one or more lighting units by the first control device is at least partially restricted.

The lighting system comprises one or more lighting units (e.g. one or more lamps) and at least two lighting control devices: a first control device and a portable control device. The first control device may, for example, be a central lighting controller (e.g. a bridge, a cloud application, etc.), a smartphone, a sensor, a light switch, etc. The portable control device is a device that can be carried by a user, for example a smartphone, a wearable device or a light switch. A user carrying the portable control device may position the portable control device at a position relative to the surface, whereupon the one or more lighting units are set to a first or second control mode in dependence thereon. The surface may be a surface of an object identifiable by a user as a surface for positioning the portable control device (e.g. a docking surface, a surface of the one or more of the one or more lighting units, a (wall) plate, etc.). In the first control mode, the control of the one or more lighting units is no different from regular control, i.e. the one or more lighting units can be controlled by both the first control device and the portable control device. When the user repositions the portable control device (e.g. a light switch) to a (predefined) position relative to the surface (e.g. by placing the portable control device on the surface), the one or more lighting units are set to a second control mode. In the second control mode, the one or more lighting units are configured to be controlled by the portable control device (e.g. the light switch), and wherein control of the one or more lighting units by the first control device (e.g. a bridge, a smartphone, a sensor, etc.) is at least partially restricted. This enables a user to restrict control of one or more lighting units in a lighting system in an intuitive way, because the user simply needs to position the portable control device at a (predefined) position relative to the surface.

The one or more lighting units may be set to the second control mode if the portable control device is positioned on the surface, and the one or more lighting units may be set to the first control mode if the portable control device is not positioned on the surface. The lighting system may comprise a detection means for detecting if the portable control device is positioned on the surface. The means may for example be comprised in the portable control device, in the surface or comprised in a further device. This enables a user to restrict control of one or more lighting units in a lighting system in an intuitive way, because the user simply needs to position the portable control device on the surface to restrict control of the one or more lighting units.

The surface may comprise a first area and a second area, and the step of determining the position of the portable control device relative to the surface may comprise: determining if the portable control device is located at the first area or at the second area, wherein the one or more lighting units may be set to the first control mode if the portable control device is located at the first area and the one or more lighting units may be set to the second control mode if the portable control device is located at the second area. The lighting system may comprise a means for detecting at which area the portable control device has been positioned. The means may for example be comprised in the portable control device, located at one or more of the areas or comprised in a further device. The surface may comprise two (or more) areas (e.g. two docking areas). This enables a user to restrict control of one or more lighting units in a lighting system in an intuitive way, simply by moving the portable control device from the first area to the second area.

The step of determining the position of the portable control device relative to the surface may comprise: determining an orientation of the portable control device relative to the surface. The step of setting the one or more lighting units to the first control mode or the second control mode may be based on the orientation of the portable control device relative to the surface. The lighting system may comprise a means for detecting the orientation of the portable control device relative to the surface. The means may for example be comprised in the portable control device, the surface or a further device. This enables a user to restrict control of one or more lighting units in a lighting system in an intuitive way, simply by changing the orientation of the portable control device relative to the surface.

The surface may be a docking surface comprising one or more docking elements configured to receive the portable control device. The docking surface may for example be configured to receive a light switch. This enables a user to switch between the control modes by, for example, positioning the portable control device on the docking surface, by reorienting the portable control device relative to the docking surface and/or by moving the portable control device from a first to a second docking surface.

Additionally or alternatively, the surface may be a part of the surface of a luminaire comprising the one or more lighting units. This enables a user to restrict control of one or more lighting units in a lighting system in an intuitive way, simply by positioning the portable control device on the surface of the luminaire to select the second control mode.

The lighting system comprises a further control device for controlling the one or more lighting units. When the one or more lighting units have been set to the second control mode, control of the one or more lighting units by the further control device is less restricted compared to the first control device. The further device may therefore be less restricted, enabling additional control functionality.

The portable control device, the surface or the one or more lighting units may comprise a mode indicator for indicating a current mode of the one or more lighting units. The method may further comprise communicating a signal to the mode indicator to indicate the current mode of the one or more lighting units. This is beneficial because the user knows to which control mode the one or more lighting units have been set.

The control of the one or more lighting units by the first control device may be fully restricted when the one or more lighting units have been set to the second control mode. In other words, the first control device cannot control the one or more lighting units when the one or more lighting units have been set to the second control mode. Alternatively, the control of the one or more lighting units by the first control device may be partially restricted when the one or more lighting units have been set to the second control mode.

The lighting system may comprise a further one or more lighting units, and, when the one or more lighting units have been set to the first control mode, the portable control device may be configured to control the one or more lighting units and a further one or more lighting units, and, when the one or more lighting units have been set to the second control mode, the portable control device may be configured to only control the one or more lighting units. When the portable control device (e.g. a light switch) is configured to control multiple lighting units, the portable control device may be restricted to controlling only the one or more lighting units when the one or more lighting units have been set to the second control mode. This is beneficial, because it results in a more intuitive control of lighting units of the lighting system.

The control of the one or more lighting units by the first control device may, for example, be restricted to a selected set of lighting control commands. Certain commands, for example "all lights off" or emergency commands may be communicated and executed by the one or more lighting units.

The control of the one or more lighting units by the first control device may, for example, be restricted to a selected set of user inputs indicative of lighting control commands. The control of the one or more lighting units by the first control device may, for example, be restricted to control via smart devices only and, for example, not via a voice commands. Additionally or alternatively, the control of the one or more lighting units by the first control device may, for example, be restricted to a selected set of automatically generated lighting control commands. Additionally or alternatively, the control of the one or more lighting units by the first control device may, for example, be restricted to a selected set of light properties of the one or more lighting units (e.g. color, intensity, beam shape, beam direction, etc.), whereas other light properties may be excluded.

According to a second aspect of the present invention, the object is achieved by a program product for a computing device, the computer program product comprising computer program code to perform any of the above-mentioned methods when the computer program product is run on a processing unit of the computing device.

According to a third aspect of the present invention, the object is achieved by a controller for restricting control of one or more lighting units in a lighting system, the lighting system comprising the one or more lighting units, a first control device for controlling the one or more lighting units and a portable control device remote from the one or more lighting units for wirelessly controlling the one or more lighting units, the controller comprising a processor configured to:

determine a position of the portable control device relative to a surface, set the one or more lighting units to a first control mode or a second control mode in dependence on the position of the portable control device relative to the surface, wherein, when the one or more lighting units have been set to the first control mode, the one or more lighting units are configured to be controlled by both the first control device and the portable control device, wherein, when the one or more lighting units have been set to the second control mode, the one or more lighting units are configured to be controlled by the portable control device, and wherein control of the one or more lighting units by the first control device is at least partially restricted.

It should be understood that the computer program product and the controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1A:
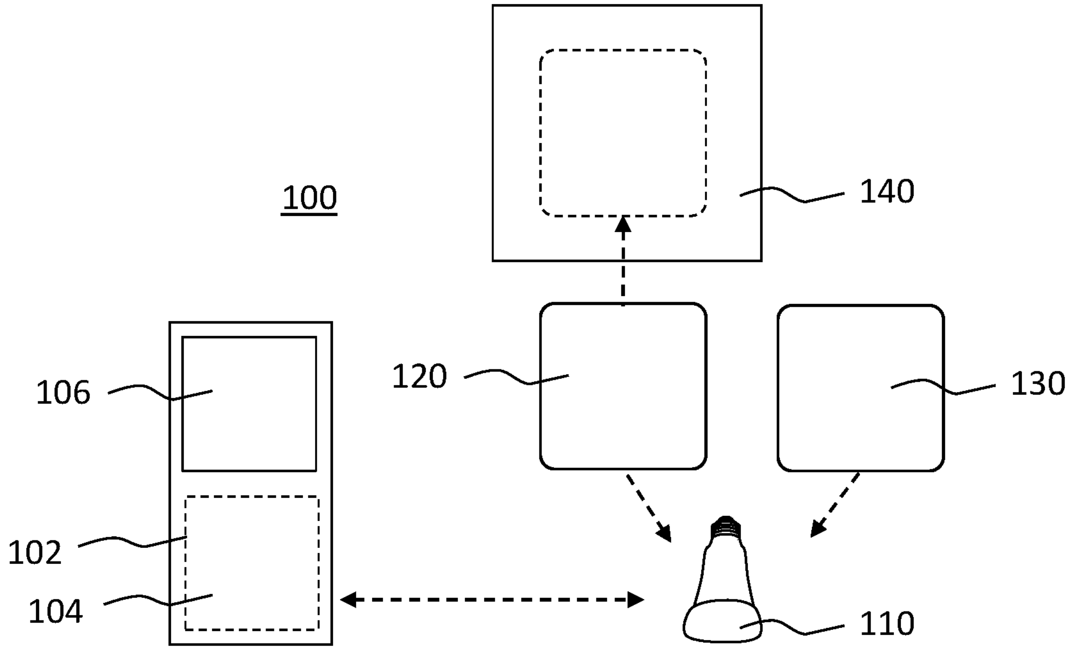
FIGS. 1*a* and 1*b* show schematically embodiments of a lighting system comprising a lighting unit, a first control device for controlling the lighting unit, a portable control device for controlling the lighting unit and a controller for restricting control of the lighting unit.
Figure 1B:
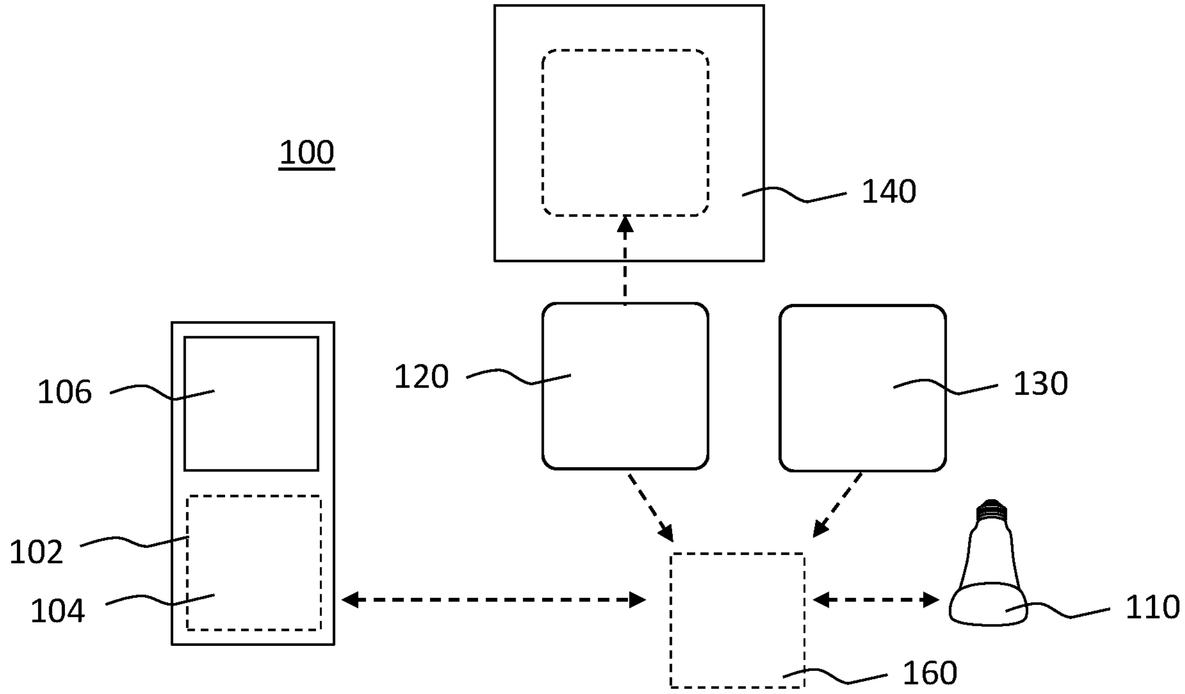

FIGS. 1*a* and 1*b* show schematically embodiments of a lighting system 100. The lighting system 100 comprises a lighting unit 110, a first control device 130 for controlling the lighting unit 110, a portable control device 120 for wirelessly controlling the lighting unit 110 and a controller 102 for restricting control of the lighting unit 110. The system 100 further comprises a surface 140 on which the portable control device 120 can be positioned. FIGS. 1*a* and 1*b* show examples of system architectures of lighting systems 100, wherein in the lighting system 100 of FIG. 1*a*, the controller 102, the first control device 130 and the portable control device 120 communicate directly with the lighting unit 110, and wherein in the lighting system 100 of FIG. 1*b*, the controller 102, the first control device 130 and the portable control device 120 communicate directly with the lighting unit 110 via an intermediary device 160, such as a bridge, a smartphone, a cloud application, etc. It should be understood that these system architectures are mere examples, and that the skilled person is able to design alternative system architectures without departing from the scope of the appended claims.

The controller 102 is configured to restrict control of the lighting unit 110 for the first lighting control device 130 based on a position of the portable control device 120 relative to the surface 140. The controller comprises one or more processors 106 configured to determine the position of the portable control device 120 relative to the surface 140. Based on the position of the portable control device 120 relative to the surface 140, the processor 106 may set the (one or more) lighting unit(s) 110 to a first control mode or a second control mode. In the first control mode, the lighting unit 110 is configured to be controlled by both the first control device 130 and the portable control device 120. In the second control mode, the lighting unit 110 is configured to be controlled by the portable control device 120, and control of the lighting unit 110 by the first control device 130 is at least partially restricted.

The controller 102 may be comprised in any device configured to restrict control of the lighting unit 110. The controller 102 may, for example, be comprised in an intermediary device 160 such as a bridge, a server connected via the internet, a smartphone, etc. Alternatively, the controller 102 may be comprised in the lighting unit 110, or in the portable control device 120. The position of the controller 102 may depend on the system architecture of the lighting system 100. The controller 102 may comprise a communication unit 104 configured to receive and/or transmit signals to and/or from the devices in the lighting system. Various wired and wireless communication protocols may be used, for example Ethernet, DMX, DALI, USB, Bluetooth, Wi-Fi, Li-Fi, 3G, 4G, 5G or ZigBee.

The processor 106 may be configured to receive a signal indicative of the position of the portable control device 120 relative to the surface 140. The signal may be received from the portable control device 120, from an intermediary device 160 such as a bridge, from a device comprising the surface 140, etc., depending on the system architecture of the lighting system 100.

In a first example, wherein the controller 102 is comprised in an intermediary device 160 such as a bridge, the controller 102 may receive the signal from the portable control device 120 or from a device comprising the surface 140 (e.g. a docking station). The signal may, for example, be indicative of that the portable control device 120 has been positioned on the surface 140, and the processor 106 may set the lighting unit 110 to the second control mode. The processor 106 may, for example, be further configured to control the lighting unit 110. Based on the restrictions of control of the lighting unit 110 in the second control mode, the processor 106 may determine whether to transmit lighting control commands to the lighting unit 110 when signals from the first control device 130 are received. Alternatively, the processor 106 may send a mode command to the lighting unit to change the mode of the lighting unit 110. The lighting unit 110 may still receive lighting control commands from the first control device 130, but a control unit of the lighting unit may determine whether to execute these lighting control commands based on the restrictions of the second control mode.

In a second example, wherein the controller 102 is comprised in the lighting unit 110, the lighting unit 110 may still receive lighting control commands from the first control device 130 when set to the second control mode, but the processor 106 of the controller 102 comprised in the lighting unit may determine whether to execute these lighting control commands based on the restrictions of the second control mode.

In another example, the processor 106 may set the lighting unit 110 to the second control mode by communicating a restriction message to the first control device 130 to inform the first control device 130 about its restrictions regarding control of the lighting unit 110. A control unit in the first control device 130 may then determine whether to transmit lighting control commands to the lighting unit 110 based on the restrictions.

It should be understood that the above-mentioned examples of system architectures and ways of setting the lighting unit 110 to the first or second control mode are mere examples, and that the skilled person is able to design alternatives without departing from the scope of the appended claims.

The first control device 130 may be any lighting control device configured to control the lighting unit 110. Examples include but are not limited to a central lighting controller (e.g. a bridge, a cloud application, etc.), a smartphone, a voice assistant, a sensor, a light switch, etc. The first control device 130 may be portable device. The first control device 130 is configured to control the lighting unit 110, for example by wirelessly communicating lighting control commands to the lighting unit 110. The lighting control commands may be communicated when a user input has been received (e.g. when a user presses a button, provides a voice control command, etc.), when a sensor has been triggered (e.g. when a user is present, when an RF beacon is activated, etc.), when a lighting control routine is activated (e.g. when one or more lighting units 110 are switched on at sunset or at a predefined time), etc.

The portable control device 120 is a device remote from the lighting unit that can be carried by a user, for example a smartphone, a wearable device or a light switch. The portable control device 120 is configured to wirelessly control the lighting unit 110, for example by communicating lighting control commands to the lighting unit 110. The lighting control commands may be communicated when a user input has been received at the portable control device 120 (e.g. when a user presses a button, provides a voice control command, etc.).

The lighting unit 110 may be controlled by communicating (e.g. via a communication module) lighting control commands to the lighting unit 110. The lighting unit may be any type of lighting unit arranged for receiving lighting control commands. The lighting unit 110 comprises one or more light sources (e.g. LED/OLED light sources). The lighting unit may comprise an input configured to receive lighting control commands from the controller 102, from the first control device 130, from the portable control device 120, etc., depending on the system architecture of the lighting system, and the lighting unit 110 may comprise a control unit to control the one or more light sources based on the lighting control commands. The lighting control commands may relate to one or more light settings, which may for instance be defined as RGB/HSL/HSB color values, CIE color values, intensity (brightness) values, beam angle/shape values, etc.

The surface 140 is a surface for positioning the portable control device 130 on. The surface 140 may be a surface 140 of an object identifiable by a user as a surface 140 for positioning the portable control device (e.g. a docking surface, a surface of the lighting unit, a (wall) plate, etc.). In the first control mode, the control of the lighting unit 110 is no different from regular control, i.e. the lighting unit can be controlled by both the first control device 130 and the portable control device 120. When the user repositions the portable control device 130 (e.g. a light switch) to a (predefined) position relative to the surface 140 (e.g. by placing the portable control device 130 on the surface 140), the lighting unit 110 is set to a second control mode. When the system comprises a plurality of lighting units 110, the surface 140 (e.g. a wall plate) may be associated with the plurality of lighting units such that when a user positions the portable control device 120 on the surface 140, the plurality of lighting units are set to the second control mode. The plurality of lighting units may, for example, be grouped. This enables a user to restrict control of the group of lighting units by positioning the portable control device 120 on the surface 140. The plurality of lighting units may, for example, be located in the same space (e.g. a room). This enables a user to restrict control of the lighting units in the space by positioning the portable control device 120 on the surface 140.

The lighting system 100 may comprise a detection means for detecting the position of the portable control device 120 relative to the surface 140. The means may for example be comprised in the portable control device 120, in the surface 140 or comprised in a further device.

The detection means may, for example, comprise a magnetic field sensor for detecting the presence of a magnetic field (caused by one or more magnets comprised in the portable control device 120 and/or the surface 140). The magnetic field sensor may provide a signal indicating a change of the magnetic field, which may be indicative of that the portable control device 110 has been positioned on/removed from the surface 140.

The detection means may, for example, comprise a light sensor comprised in the portable control device 120 or in the surface 140, configured to detect light emitted by a light source (e.g. an LED) comprised in the surface 140 or in the portable control device 120, respectively. The light sensor may provide a signal indicating a change of light, which may be indicative of that the portable control device 110 has been positioned on/removed from the surface 140.

The detection means may, for example, comprise an Near Field Communication (NFC) module comprised in the portable control device 120 or in the surface 140, configured to detect presence of a (passive or active) NFC tag comprised in the surface 140 or in the portable control device 120, respectively. The NFC module light sensor may provide a signal indicating indicative of that the portable control device 110 has been positioned on/removed from the surface 140.

The detection means may, for example, comprise a mechanical switch (e.g. a button) comprised in the portable control device 120 or in the surface 140. The mechanical switch may provide a signal indicative of that the portable control device 110 has been positioned on/removed from the surface 140. It should be understood that the above-mentioned detection means for detecting the position of the portable control device 120 relative to the surface 140 are mere examples, and that the skilled person is able to design alternatives without departing from the scope of the appended claims.

Figure 2A:
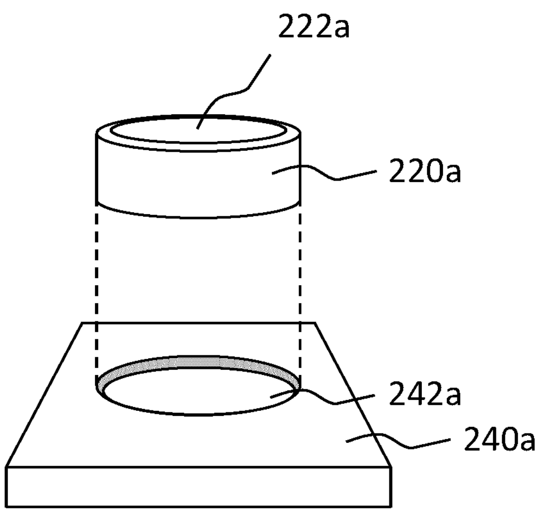
FIGS. 2*a* and 2*b* show schematically embodiments of docking surfaces for portable control devices.

The processor 106 may be configured to set the lighting unit 110 to the second control mode if the portable control device 120 is positioned on the surface 140, and set the lighting unit 110 to the second control mode if the portable control device 120 is not positioned on the surface 140. This is illustrated in FIG. 2*a*, which shows a docking surface 240*a* comprising an area 242*a* for receiving a light switch 220*a*. The light switch may comprise one or more buttons 222*a* for receiving user inputs for controlling the light output of the lighting unit 110. The processor 106 (not shown) may receive a signal indicative of that the light switch 220*a* has been positioned on the docking surface 240*a*. The signal may, for example, be received from a communication module comprised in the light switch 220*a* or in the surface 240*a*. This enables a user to restrict control of the lighting unit 110 by positioning the portable control device 222*a* on the surface 240*a*.

Figure 2B:
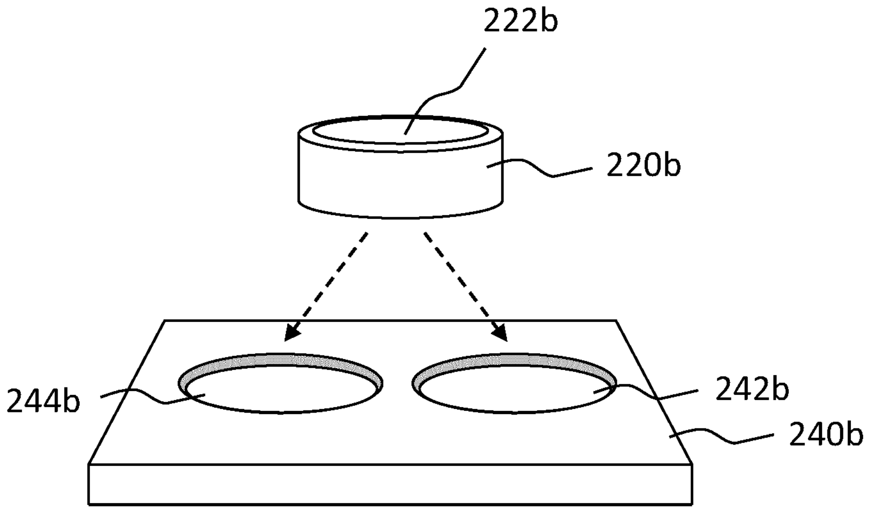

The surface 140 may comprise a first area and a second area, and the processor 106 may be configured to determine if the portable control device 120 is located at the first area or at the second area of the surface 140. The processor 106 may be further configured to set the lighting unit 110 to the first control mode if the portable control device 120 is located at the first area and set the lighting unit 110 to the second control mode if the portable control device 120 is located at the second area. This is illustrated in FIG. 2*b*, which shows a docking surface 240*b* comprising a first area 242*b* and a second area 2*b* for receiving a light switch 220*b*. The light switch may comprise one or more buttons 222*b* for receiving user inputs for controlling the light output of the lighting unit 110. The processor 106 (not shown) may receive a signal (which may, for example, be received from a communication module comprised in the light switch 220*b* or in the surface 240*b*) indicative of the position of the light switch 220*b*. If, for example, the signal is indicative of that the light switch 220*b* is located at the first area 242*b*, the processor 106 may set the lighting unit 110 to the first control mode. If, for example, the signal is indicative of that the light switch 220*b* is located at the second area 2*b*, the processor 106 may set the lighting unit 110 to the second control mode. This enables a user to restrict control of the lighting unit 110 by moving the portable control device 222*b* from the first area 242*b* to the second area 2*b*.

Figure 3A:
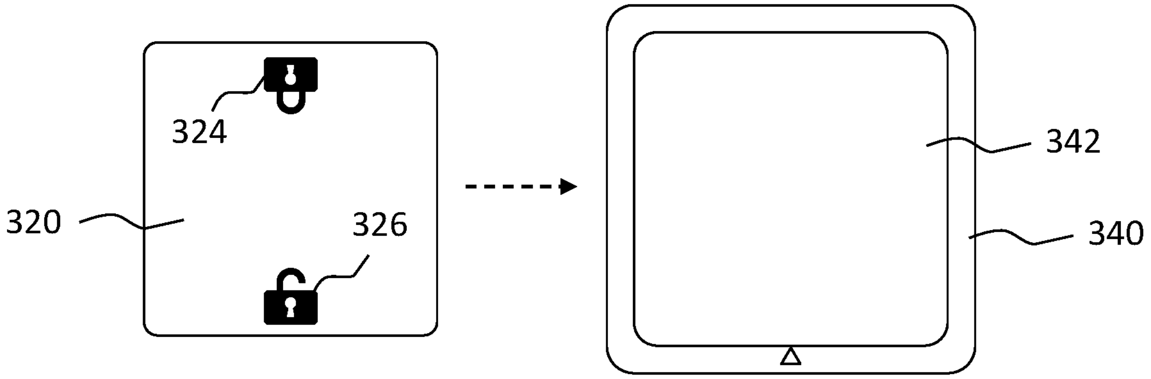
FIGS. 3*a*-3*c* show schematically embodiments of a portable control device positioned in different orientations on a docking surface.
Figure 3B:
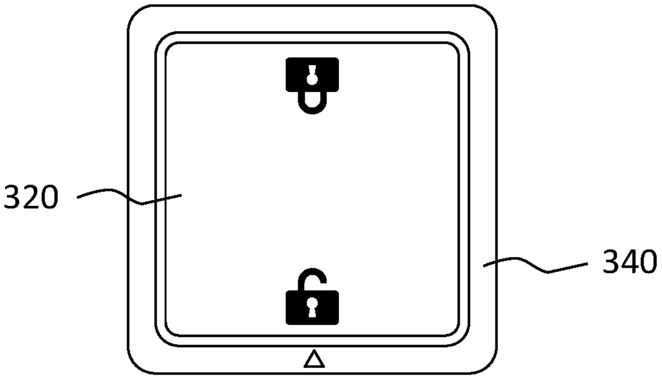
Figure 3C:
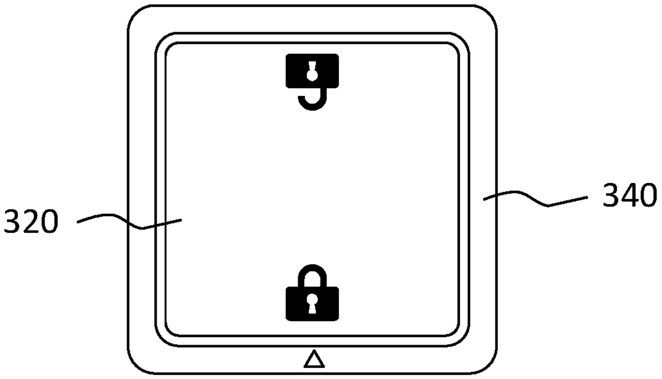

The processor 106 may be further configured to set the lighting unit to the first control mode or the second control mode based on the orientation of the portable control device 120 relative to the surface. The processor 106 may be configured to receive a signal indicative of the orientation of the portable control device 120. The signal may, for example, be received from a communication module comprised in the portable control device 120 or in the surface 140. This is illustrated in FIGS. 3*a*-3*c*. FIG. 3*a* shows a portable control device 320 (e.g. a light switch) which can be positioned on a (docking) surface 340 comprising an area 342 for receiving the portable control device 320 at different orientations. The portable control device 320 is shown with two icons 324, 326 indicating the different control modes (restricted 324 and unrestricted 326). FIG. 3*b* illustrates that the portable control device 320 has been positioned at a first orientation relative to the surface 340, and FIG. 3*c* illustrates that the portable control device 320 has been positioned at a second orientation relative to the surface 340. When the portable control device 120 has been oriented as indicated in FIG. 3*b*, the processor 106 may set the lighting unit to the first control mode (i.e. the unrestricted mode as indicated by icon 324). When the portable control device 120 has been oriented as indicated in FIG. 3*c*, the processor 106 may set the lighting unit to the second control mode (i.e. the restricted mode as indicated by icon 326). This enables a user to restrict control of the lighting unit 110 by changing the orientation of the portable control device 320 relative to the surface 340.

The surface 140 may be a docking surface (as illustrated in FIGS. 2*a*-4) comprising one or more docking elements 242*a*, 242*b*, 2*b*, 342, 2, configured to receive the portable control device 120. The docking element may for example be configured to receive a light switch or a personal device such as a smartphone. This enables a user to switch between the control modes by, for example, positioning the portable control device 120 on the docking element 242*a*, by reorienting the portable control device relative to the docking element 342 and/or by moving the portable control device from a first docking element 242*b* to a second docking element 2*b*.

Figure 4:
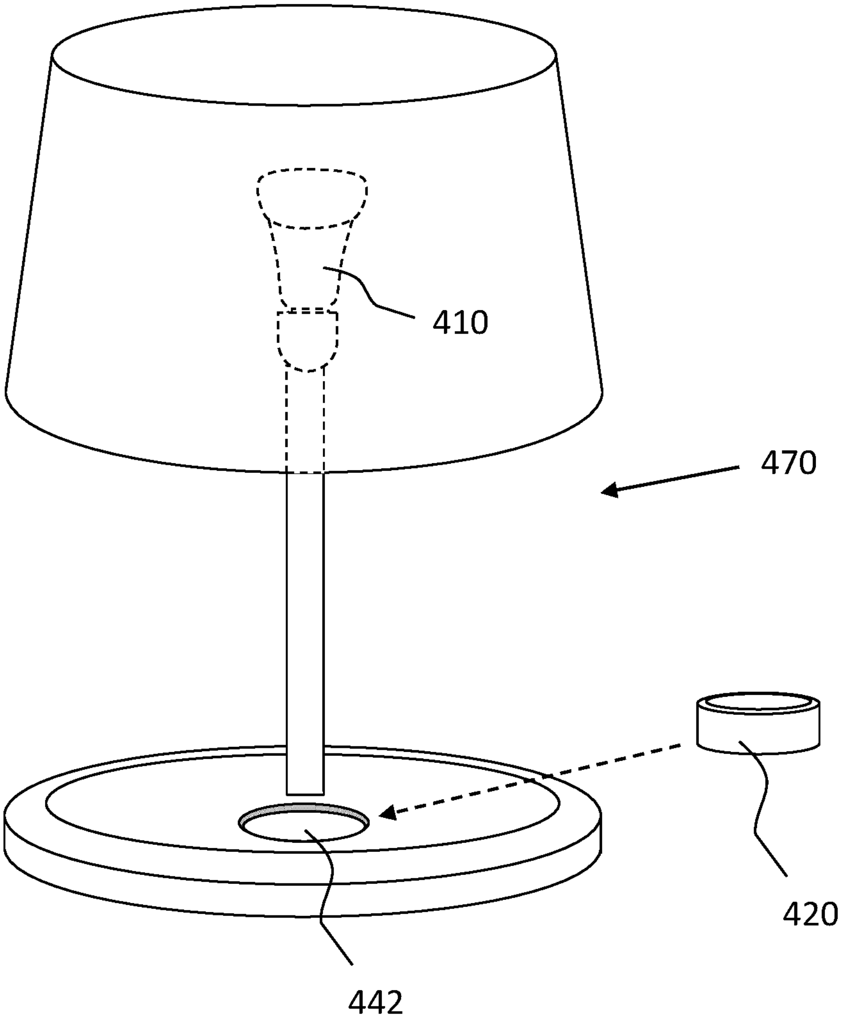
FIG. 4 shows schematically an embodiment of a luminaire comprising a light source and a docking surface for receiving a portable control device.

The (docking) surface 140 may be a part of the surface 140 of a luminaire comprising the lighting unit 110. This is illustrated in FIG. 4, wherein a luminaire 470 (in this non-limiting example a table luminaire) comprises a lighting unit 410 and a surface 2 for receiving a portable control device 420 (in this example a light switch). This enables a user to restrict control of the lighting unit 110 by positioning the portable control device 420 on the surface 2 of the luminaire 470 to select the second control mode. Alternatively, the surface 140 may be located remote from the lighting unit 110. The surface 140 may, for example, be the surface of a wall plate, or a wireless charger configured to charge the portable control device 120.

In above-mentioned examples, the processor 106 may be configured to set the lighting unit 110 to the second control mode when the portable control device 120 is positioned on (an area of) the surface 140. In other examples, the processor 106 may be configured to set the lighting unit 110 to the first control mode when the portable control device 120 is positioned on (an area of) the surface 140, and to set the lighting unit 110 to the second control mode when the portable control device 120 is not positioned on (an area of) the surface 140. If, for example, the surface 140 is a wall plate or a part of a luminaire comprising the lighting unit 110, the user may remove the portable device 120 from the surface 140 to take control of the lighting unit 110 (and thereby restrict other control devices from controlling the lighting unit). In another example, a user may wish to (fully) restrict control of one or more lighting units 110 (e.g. when a user leaves home), and the user may remove the portable device 120 from the surface 140 to do so.

In another example, the processor 106 may be configured to receive one or more signals indicative of a distance between the portable device 120 and the surface 140, and the processor 106 may be configured to set the lighting unit 110 to the second control mode when distance exceeds a (predefined or user-defined) threshold, and set the lighting unit 110 to the first control mode when the distance does not exceed the threshold. The one or more signals indicative of the distance may, for example, be signals communicated between the portable control device 120 and a communication module comprised in the surface 140. The processor 106 may be configured to analyze these signals to determine the distance, for example by analyzing the signal strength, signal to noise ratio, etc. of the one or more signals.

The lighting system 100 may comprise a further control device for controlling the lighting unit 110, wherein, when the lighting unit 110 has been set to the second control mode, control of the lighting unit 110 by the further control device is less restricted than the control of the lighting unit 110 by the first control device 130. The further control device may, for example, be a master control device configured to (always) control the lighting unit 110 (e.g. by switching off all lights at a certain time of day). The further control device may, for example, be an emergency control device configured to control the lighting unit in case of an emergency (e.g. by switching on the lighting unit in case of an emergency).

The lighting system 100 may comprise a further lighting unit, and, when the lighting unit 110 has been set to the first control mode, the portable control device 120 may be configured to control the lighting unit 110 and a further lighting unit, and, when the lighting unit 110 has been set to the second control mode, the portable control device 120 may be configured to only control the lighting unit. The processor 106 may be configured to set the portable control device 120 to a first mode (wherein the portable control device 120 is set to control the lighting unit 110 and the further lighting unit) when the lighting unit 110 has been set to the first control mode, and set the portable control device 120 to a second mode (wherein the portable control device 120 is set to control the lighting unit 110 only) when the lighting unit 110 has been set to the second control mode. Thus, when the portable control device 120 (e.g. a light switch) is configured to control multiple lighting units of the lighting system 100, the portable control device 120 may be restricted to controlling only the lighting unit when the lighting unit has been set to the second control mode.

The processor 106 may be further configured to control a mode indicator (e.g. LED indicator lights, a display, a loudspeaker) to indicate the current mode of the lighting unit

Figure 5A:
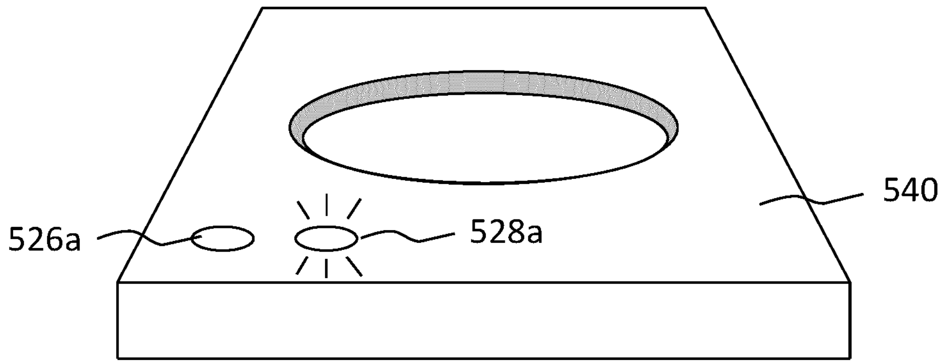
FIG. 5*a* shows schematically an embodiment of a surface comprising a mode indicator for indicating a current mode of the lighting unit.
Figure 5B:
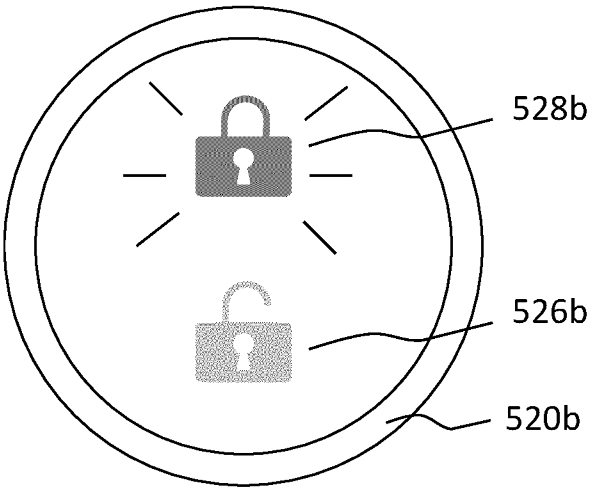
FIG. 5*b* shows schematically an embodiment of a portable control device comprising a mode indicator for indicating a current mode of the lighting unit.

110. The mode indicator may, for example, be comprised in the portable control device 120, the surface 140 or the lighting unit 110 or a luminaire comprising the lighting unit 110. The processor 106 may communicate a signal to the mode indicator to indicate the current mode (e.g. the first control mode or the second control mode) of the lighting unit 110. FIG. 5*a* illustrates a surface 540 comprising two indicator lights 526*a*, 528*a* below the surface 540. The indicator lights (e.g. LEDs) may indicate the current mode (e.g. by rendering light of a certain color). FIG. 5*b* illustrates a portable control device 520*b* comprising two indicator lights below a surface of the portable control device 520*b*. The portable control device 520*b* comprises a first icon 526*b* and a second icon 528*b* of transparent material for indicating the current state when the respective indicator light is switched on. FIG. 5*b* shows an example wherein the second (restricted) control mode is active.

In the second control mode, the lighting unit 110 is configured to be controlled by the portable control device 120, and control of the lighting unit 110 by the first control device 130 is at least partially restricted. The restrictions may be predetermined and/or based on user preferences or user input received via a user interface of the lighting system 100.

Control of the lighting unit 110 by the first control device 130 may, for example, be restricted to a selected set of lighting control commands. Certain commands, for example "all lights off" or emergency commands may be communicated to and executed by the lighting unit 110.

Control of the lighting unit 110 by the first control device 130 may, for example, be restricted to a selected set of (types of) user inputs indicative of lighting control commands. In a first example, control of the lighting unit 110 by the first control device 130 may, for example, be restricted to control via button presses only and, for example, not via a voice commands. In a second example, control of the lighting unit 110 by the first control device 130 may, for example, be restricted to control via touch displays only and, for example, not via a gestures.

Control of the lighting unit 110 by the first control device 130 may, for example, be restricted to a selected set of automatically generated lighting control commands. For instance, certain preprogrammed routines may be executed (e.g. to turn all lights off in at midnight) by the lighting unit while other are not executed (e.g. switching the lighting unit from a certain illumination mode (e.g. task illumination) to another illumination mode (e.g. entertainment illumination).

Control of the lighting unit 110 by the first control device 130 may, for example, be restricted to a selected set of light properties of the lighting unit 110 (e.g. color, intensity, beam shape, beam direction, etc.), whereas other light properties may be excluded.

Control of the lighting unit 110 by the first control device 130 may, for example, be fully restricted. In other words, when the lighting unit 110 has been set to the second control mode, the lighting unit cannot be controlled by the first lighting control device 130.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of restricting control of one or more lighting units in a lighting system, the lighting system comprising the one or more lighting units, a first control device for controlling the one or more lighting units and a portable control device remote from the one or more lighting units for wirelessly controlling the one or more lighting units, the method comprising:

determining a position of the portable control device relative to a surface for positioning the portable control device on, and setting the one or more lighting units to a first control mode or a second control mode in dependence on the position of the portable control device relative to the surface, wherein, when the one or more lighting units have been set to the first control mode, the one or more lighting units are configured to be controlled by both the first control device and the portable control device, wherein, when the one or more lighting units have been set to the second control mode, the one or more lighting units are configured to be controlled by the portable control device; and wherein control of the one or more lighting units by the first control device is at least partially restricted.

2. The method of claim 1, wherein the one or more lighting units are set to the second control mode if the portable control device is positioned on the surface, and wherein the one or more lighting units are set to the first control mode if the portable control device is not positioned on the surface.

3. The method of claim 1, wherein the surface comprises a first area and a second area, and wherein the determining the position of the portable control device relative to the surface comprises: determining if the portable control device is located at the first area or at the second area, and wherein the one or more lighting units are set to the first control mode if the portable control device is located at the first area and the one or more lighting units are set to the second control mode if the portable control device is located at the second area.

4. The method of claim 1, wherein the determining the position of the portable control device relative to the surface comprises: determining an orientation of the portable control device relative to the surface, and wherein the setting the one or more lighting units to the first control mode or the second control mode is based on the orientation of the portable control device relative to the surface.

5. The method of claim 1, wherein the surface is a docking surface comprising one or more docking elements configured to receive the portable control device.

6. The method of claim 1, wherein the one or more lighting units are comprised in a luminaire, and wherein the surface is a part of the surface of the luminaire.

7. The method of claim 1, wherein the lighting system comprises a further control device for controlling the one or more lighting units, and wherein, when the one or more lighting units have been set to the second control mode, control of the one or more lighting units by the further control device is less restricted than the first control device.

8. The method of claim 1, wherein the lighting system comprises a further lighting unit, wherein, when the one or more lighting units has been set to the first control mode, the portable control device is configured to control the one or more lighting units and a further lighting unit, and wherein, when the one or more lighting units have been set to the second control mode, the portable control device is configured to only control the one or more lighting units.

9. The method of claim 1, wherein, when the one or more lighting units have been set to the second control mode, the control of the one or more lighting units by the first control device is restricted to a selected set of lighting control commands.

10. The method of claim 9, wherein, when the one or more lighting units have been set to the second control mode, the control of the one or more lighting units by the first control device is restricted to a selected set of user inputs indicative of lighting control commands.

11. The method of claim 9, wherein, when the one or more lighting units have been set to the second control mode, the control of the one or more lighting units by the first control device is restricted to a selected set of automatically generated lighting control commands.

12. The method of claim 1, wherein, when the one or more lighting units have been set to the second control mode, the control of the one or more lighting units by the first control device is fully restricted.

13. A non-transitory computer program product for a computing device, the computer program product comprising computer program code to perform the method of claim 1 when the computer program product is run on a processing unit of the computing device.

14. A controller for restricting control of one or more lighting units in a lighting system, the lighting system comprising the one or more lighting units, a first control device for controlling the one or more lighting units and a portable control device remote from the one or more lighting units for wirelessly controlling the one or more lighting units, the controller comprising a processor configured to:

determine a position of the portable control device relative to a surface for positioning the portable control device on, and set the one or more lighting units to a first control mode or a second control mode in dependence on the position of the portable control device relative to the surface, wherein, when the one or more lighting units have been set to the first control mode, the one or more lighting units is configured to be controlled by both the first control device and the portable control device, wherein, when the one or more lighting units have been set to the second control mode, the one or more lighting units is configured to be controlled by the portable control device, and wherein control of the one or more lighting units by the first control device is at least partially restricted.

15. A system comprising the controller of claim 14 and a detector to detect that the portable control device has been positioned on the surface.

* * * * *